Jan. 18, 1938.  F. J. HINDERLITER  2,105,885
HOLLOW TRIP CASING SPEAR
Original Filed March 30, 1932
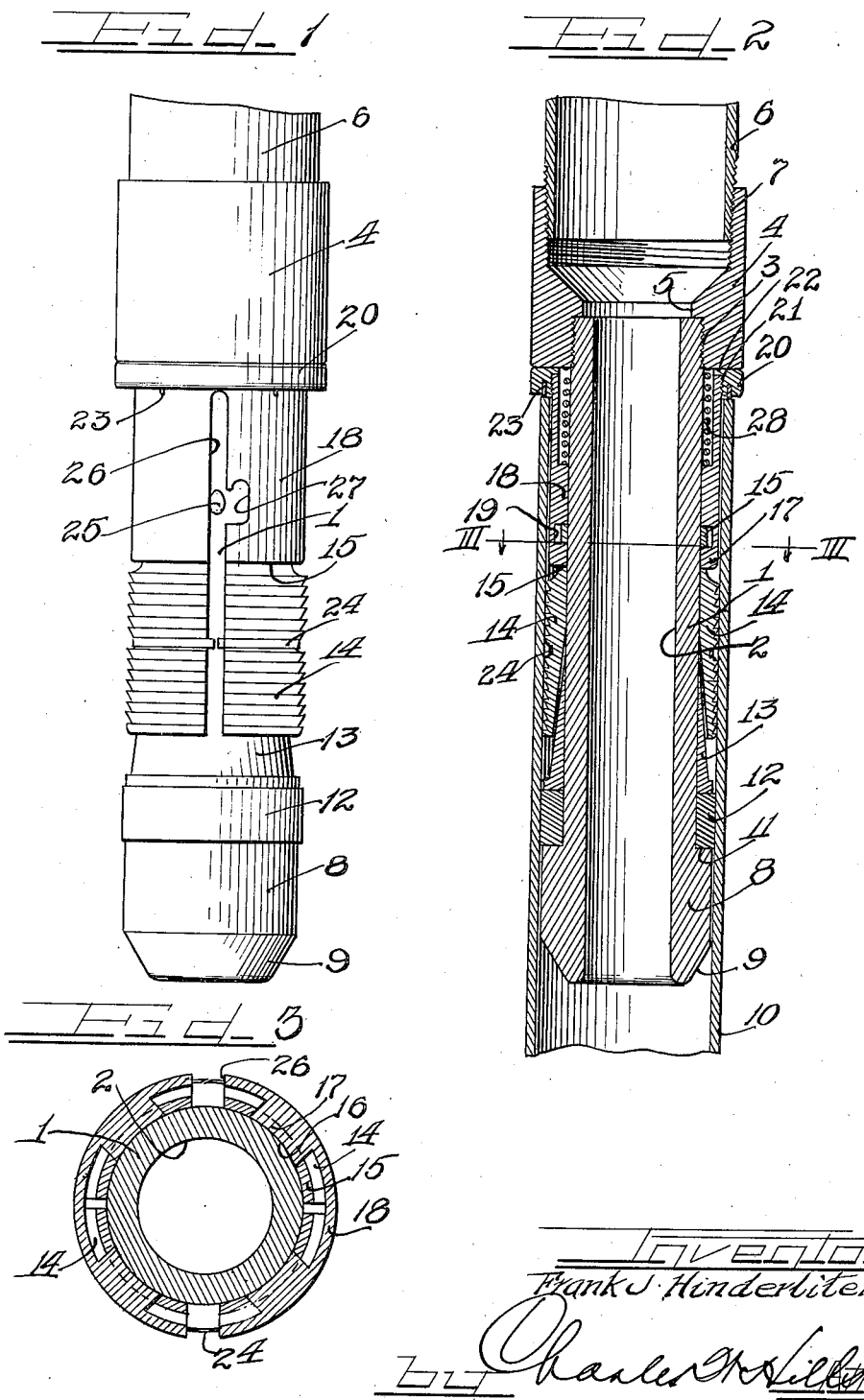

Patented Jan. 18, 1938

2,105,885

UNITED STATES PATENT OFFICE 2,105,885

HOLLOW TRIP CASING SPEAR

Frank J. Hinderliter, Tulsa, Okla.

Original application March 30, 1932, Serial No. 601,951. Divided and this application January 7, 1935, Serial No. 615

4 Claims. (Cl. 294—96)

This invention relates to improvements in fishing tools for retrieving objects or pulling casings from well holes, and more particularly to fishing tools of the type adapted to enter the object to be retrieved or pulled from the well, such, for example, as a drill pipe, casing, or the like.

The present invention embodies divisional subject matter taken from my co-pending application for Letters Patent entitled "Hollow trip casing spear", filed March 30, 1932, Serial No. 601,951, now issued in Patent No. 1,996,068, dated June 2, 1935.

An object of this invention is the provision of a fishing tool or spear of the above mentioned character which is formed to permit the passage of fluid therethrough, there being means associated with the tool or spear for effecting a seal between it and the object to be retrieved to insure the passage of such fluid through the object also, such seal being enhanced or rendered more effective by a lifting action upon the object to be retrieved.

Another object of the invention is the provision of a fishing tool of the character set forth herein equipped with gripping means controllable at will by vertical and rotary movement of the tool relatively to the object to be retrieved.

Still another object of this invention is the provision of a fishing tool adapted to enter the object to be retrieved, the fishing tool carrying means to form a seal between the tool and the object, and means for gripping the inside surface of the object, with guiding means for urging the gripping means into gripping position, said guide means being carried by the sealing means so that when a grip is had on the object to be retrieved, the weight of this object will be carried by the sealing means causing the same to be displaced to give a more positive seal.

It is also an object of this invention to provide a fishing tool of the character set forth herein which is simple in construction, very durable, highly efficient and very easily operated.

While some of the more salient features, characteristics and advantages of the present invention have been above pointed out, others will become apparent from the disclosures hereinafter.

The invention includes these and other features of construction and combinations of parts hereinafter described and shown in a preferred form in the drawing, as more particularly indicated by the claims.

On the drawing:

Figure 1 is a fragmentary elevational view of a fishing tool or casing spear embodying principles of the present invention.

Figure 2 is a fragmentary central vertical sectional view of the structure shown in Figure 1, showing the same in operative association with a drill pipe or well casing.

Figure 3 is an enlarged plan sectional view taken substantially as indicated by the section line III—III of Figure 2, looking in the direction shown by the arrows.

In the illustrated embodiment of the present invention, there is shown a hollow body portion 1 provided with a substantially cylindrical interior bore 2, through which a suitable fluid may be forced under pressure to aid in loosening the object to be retrieved so that the object may be more readily lifted from a well hole.

Adjacent the upper end thereof, the body portion 1 is threadedly connected, as at 3, to the lower portion of a hollow, substantially cylindrical supporting element 4 which is provided with an inwardly extending annular portion 5 forming a shoulder against which the portion 1 may seat. At the upper end thereof, the supporting element 4 is attached to an actuating part 6 in any desirable manner, such as by the threaded engagement 7.

The lower end of the body 3 is provided with a head 8, preferably structurally integral with the body and provided with relatively thick walls for encountering various elements as it is being lowered into a well and to withstand wear and strain while protecting the remainder of the tool. The lower portion of the head 8 is tapered, as at 9, thus providing a nose to facilitate the location of an object to be retrieved, such as the casing or pipe 10, and the entrance of the tool into such object. The formation of such a head 8 provides an annular shoulder 11 at the upper end thereof.

Seated upon the annular shoulder 11 is a sealing member 12, preferably annular, which may be made of rubber or some similar material. As seen clearly in Figures 1 and 2, this sealing member 12 is preferably of a slightly larger diameter than the head 8 to better insure effective sealing between the tool and the pipe 10 so that the water or other fluid forced through the tool will not leak out between the tool and pipe but will also be forced through the pipe. An annular cam element 13 having a tapered outer wall increasing downwardly in diameter is seated upon the sealing member 12. The annular cam 13 freely floats upon the body portion 1 and is movable relatively thereto.

A plurality of clutch or gripping members 14, in this instance four, each provided with an inner wall tapered complementarily to the outer wall of the cam 13, normally rest upon this cam member. Each of the clutch or wedge members 14 is provided at the upper end thereof with a relatively narrow shank 15 apertured as at 16, (Figure 3), to accommodate inwardly projecting lugs 17 integrally carried on the lower end of a wedge supporting member 18. Above each of the lugs 17, the wedge support 18 is recessed, as at 19 (Figure 2), to permit lateral or radial movement of the wedges 14 and preferably prevent vertical movement of the wedges relatively to the wedge support 18.

At the upper end thereof, the wedge support 18 is connected to a supporting ring 20 in any desirable manner, such as by a threaded connection 21. The supporting ring 20 is preferably of relatively hard material to withstand frictional engagement with the inner surface of the well as the tool is being lowered into position. An inwardly extending flange 22 is provided on the upper portion of the ring 20 to form a seat for the upper end of the wedge support 18 and to limit the threaded engagement between the wedge support and the ring. At spaced intervals therearound, the ring 20 is provided with pins 23 depending from the lower edge of the ring in position to be engaged by the upper end of the casing or pipe 10 for lifting the clutch or wedge members 14 through the supporting element 18 from gripping engagement with the casing 10. The wedge members 14 are each radially recessed to accommodate a spring ring 24 disposed around the members to urge them inwardly towards the body portion 1. Thus, when the casing or pipe 10 contacts the pins 23, the wedge members 14 are held in position while the body portion 1 together with the cam member 13 is moved downwardly relatively to the wedges, permitting the spring 24 to hold the wedges out of positive engagement with the inner wall of the casing. This spring ring 24 also prevents the wedges from sliding outwardly and interfering with the downward movement of the tool in a well hole.

While the wedges are held above the cam member 13 by the contact of the casing or pipe 10 with the pins 23, the body portion 1 may be rotated relatively to the wedges and their supporting member 18 by means of the actuating part 6. Such rotation will cause a pair of diametrically opposite pins 25 carried by the body portion 1 to be moved from corresponding bayonet slots 26 in opposite sides of the wedge support 18 in which they are normally seated into the offset portions 27 of these slots. As seen in Figure 1, an offset portion 27 of a slot 26 is relatively short, and when a pin 25 is in the offset portion 27, the wedges 14 are held in spaced relationship to the cam member 13 and the entire device may be lifted out of the casing or pipe 10. This is desirable in the event the casing, pipe or other object to be retrieved cannot be raised in spite of the amount of fluid and pressure utilized.

On the other hand, with the pins 25 in the slots 26, an upward pull on the actuating part 6 results in a jamming of the cam member 13 beneath the wedges 14 and the urging outwardly of these wedges into positive holding contact with the inner wall of the casing or pipe. Each of the wedges carries suitable teeth on the outer surface thereof for gripping the wall of the pipe.

To permit a proper assembly of the device, a slot 26 is carried downwardly through adjacent wedge members 14. In other words, adjacent wedge members are cut off slightly to widen the gap therebetween and so provide an extension of the slot 26 on each side of the device.

Contained within the upper portion of the wedge support 18 is a coiled spring 28 which surrounds the body portion 1 and abuts a supporting element 4 and an internal shoulder on the wedge support 18. This spring normally urges the wedge support 18 together with the wedges downwardly into contact with the cam member 13 for spreading the wedges, the spreading action being limited sufficiently by the spring ring 24 for the tool to enter the casing or pipe 10.

In operation, the present invention is extremely simple but nonetheless positive and effective. The tool is lowered into a well with the pins 25 in the slots 26, and the spring 28 urging downwardly upon the wedge support 18 causes the wedges 14 to engage the inner surface of the pipe to be raised. The teeth on the outer surface of the wedges are shaped so as to permit a downward movement of the wedges relatively to the pipe but to grip or bite into the inner surface of the pipe upon an upward movement of the body, since the wedges are forced outwardly by the cam member 13. In this manner, the pipe or casing may be raised. Sometimes, the pipe or casing may be stuck within the well to such an extent that it is necessary to pass water or other fluid downwardly through the tool and through the casing in an endeavor to loosen the lower portion of the casing. It is highly desirable if not essential to have a positive seal between the tool and inner wall of the casing to prevent leakage of such fluid. It will be noted from the construction above described that upon an upward movement of the body 1, the wedges 14 are not only caused to positively grip the inner casing wall, but the weight of the casing is transferred through the wedges and cam member 13 to the sealing member 12, thereby displacing this member 12 radially into positive sealing engagement with the tool and inner casing wall.

In the event it is desired to remove the tool from the casing or pipe 10 for any reason, it is a simple expedient to drop the body portion of the tool, thus moving the cam member 13 away from the wedges 14 due to the abutment of the pins 23 with the casing or pipe, rotate the body portion until the pins 25 are seated in the offset portions 27 of the bayonet slots 26, and remove the tool from the pipe. While the movement of the cam member 13 away from the wedges is against the action of the spring 28, this spring is not sufficiently strong to effectively resist such movement, but is merely of such strength as to urge the wedge members downwardly into contact with the cam member when the weight of the body portion of the tool is otherwise supported.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. In a fishing tool in combination, a hollow body, clutch means surrounding said body and adapted for gripping engagement with a pipe in which said body may be inserted, a deformable packing element on said body below said clutch means, a cam element slidably fitted on said body and disposed between said packing element and said clutch means and supported solely by said packing element whereby upon downward movement of said clutch means on said body said cam element simultaneously deforms said packing element to form a fluid tight seal with the pipe surrounding the tool and expands said clutch elements into gripping engagement with said pipe.

2. In a fishing tool in combination, a hollow body, clutch means surrounding said body and adapted for gripping engagement with a pipe in which said body may be inserted, a deformable packing element on said body below said clutch means, a cam element slidably fitted on said body and disposed between said packing element and said clutch means whereby upon downward movement of said clutch means on said body said cam element simultaneously deforms said packing element to form a fluid tight seal with the pipe surrounding the tool and expands said clutch elements into gripping engagement with said pipe, supporting means for said clutch means slidably fitted on said body and having interlocking engagement with said clutch means, and a ring fixed adjacent the upper end of said supporting means adapted to engage the top of a pipe in which the tool may be inserted.

3. In a fishing tool in combination, a hollow body, clutch means surrounding said body and adapted for gripping engagement with a pipe in which said body may be inserted, a deformable packing element on said body below said clutch means, a cam element slidably fitted on said body and disposed between said packing element and said clutch means, said cam element resting solely on and being supported solely by said packing element, whereby upon downward movement of said clutch means on said body said cam element simultaneously deforms said packing element to form a fluid tight seal with the pipe surrounding the tool and expands said clutch elements into gripping engagement with said pipe, said clutch means comprising a plurality of independent clutch elements disposed about said body and supporting means for said clutch means slidably fitted on said body and having interlocking engagement with said clutch means.

4. In a fishing tool for insertion into an object to be retrieved, a body, clutch means slidably carried by said body for engagement with the object, sealing means on said body below said clutch means for sealing engagement with said object, means carried by said body for urging said clutch means into engagement with the object upon an upward movement of the body relatively to the clutch means and for pressing said sealing means downwardly into sealing engagement with said object, and means slidably associated with said body and connected with said clutch means of a size to rest against the top of the object to be retrieved to limit the entry of the clutch means into the object and permit the engagement of said clutch means to be loosened by a relative downward movement of said body.

FRANK J. HINDERLITER.